(12) United States Patent
Alcouffe (10) Patent No.: US 7,760,825 B2
(45) Date of Patent: Jul. 20, 2010

(54) DEVICE AND METHOD FOR SUPPRESSING PULSE INTERFERENCES IN A SIGNAL

(75) Inventor: Nicole Alcouffe, Grenoble (FR)

(73) Assignee: STMicroelectronics S.A., Montrouge (FR)

( * ) Notice: Subject to any disclaimer, the term of this patent is extended or adjusted under 35 U.S.C. 154(b) by 1483 days.

(21) Appl. No.: 11/060,066

(22) Filed: Feb. 17, 2005

(65) Prior Publication Data
US 2005/0190869 A1    Sep. 1, 2005

(30) Foreign Application Priority Data
Feb. 19, 2004    (FR) .................................. 04 50312

(51) Int. Cl.
H03D 1/04 (2006.01)
H04L 25/34 (2006.01)
H03K 9/00 (2006.01)
H04B 1/10 (2006.01)
H04B 15/00 (2006.01)

(52) U.S. Cl. ........................ 375/346; 375/287; 375/316; 455/296

(58) Field of Classification Search ......... 375/342–349, 375/226, 227, 228, 254, 348, 371, 287, 316
See application file for complete search history.

(56) References Cited

U.S. PATENT DOCUMENTS

| | | | | |
|---|---|---|---|---|
| 3,621,139 A | * | 11/1971 | Gibson | 178/69 B |
| 4,392,138 A | * | 7/1983 | Jasper et al. | 342/389 |
| 4,480,156 A | * | 10/1984 | Takahashi et al. | 379/406.06 |
| 4,680,588 A | * | 7/1987 | Cantwell | 342/92 |
| 4,736,163 A | * | 4/1988 | Berkhout et al. | 327/58 |
| 4,932,039 A | * | 6/1990 | Miyashiro et al. | 375/349 |
| 5,304,990 A | * | 4/1994 | Rebourg et al. | 370/252 |

(Continued)

FOREIGN PATENT DOCUMENTS

EP    0284279    * 9/1988

OTHER PUBLICATIONS

Vostretsov, A.G. et al. "Rule for Detecting a Signal in a Background of Pulsed Interference and Noise of Uknown Intesity for Automatic Testing Systems", Proceedings of Telecommunications and Radio Engineering Part 2, 1993 ,pp. 70-73.*

(Continued)

*Primary Examiner*—Mohammad H Ghayour
*Assistant Examiner*—Sarah Hassan
(74) *Attorney, Agent, or Firm*—Lisa K. Jorgenson; William R. McClellan; Wolf, Greenfield & Sacks, P.C.

(57) ABSTRACT

A device for suppressing pulse interferences contained in a signal, including a circuit for detecting pulse interferences contained in the signal, and a circuit for correcting the signal disturbed by the detected pulse interferences, in which the detection circuit comprises a circuit for determining a first coefficient representative of a statistical feature of the variation of the signal over a first time period; a circuit for determining a second coefficient representative of a statistical feature of the variation of the signal over a second time period longer than the first time period; and a comparison circuit comparing the first and second coefficients and providing a signal indicative of the presence of a pulse interference over the first time period when the first coefficient clearly differs from the second coefficient.

13 Claims, 4 Drawing Sheets

U.S. PATENT DOCUMENTS

| | | | |
|---|---|---|---|
| 5,341,139 A * | 8/1994 | Billaud et al. | 342/40 |
| 5,586,192 A * | 12/1996 | De Bijl et al. | 381/94.8 |
| 5,610,608 A * | 3/1997 | Yamada et al. | 341/143 |
| 5,694,435 A * | 12/1997 | Kolle et al. | 375/342 |
| 5,973,553 A * | 10/1999 | Kim | 327/551 |
| 6,122,332 A * | 9/2000 | Ogata et al. | 375/346 |
| 6,501,607 B2 * | 12/2002 | Keirn et al. | 360/31 |
| 7,203,244 B2 * | 4/2007 | Alcouffe | 375/260 |
| 7,403,759 B2 * | 7/2008 | Irion et al. | 375/350 |
| 2001/0017590 A1 * | 8/2001 | Fuge et al. | 340/870.01 |
| 2005/0201475 A1 * | 9/2005 | Alcouffe | 375/260 |
| 2005/0268166 A1 * | 12/2005 | Muth | 714/25 |
| 2007/0110173 A1 * | 5/2007 | Alcouffe | 375/260 |

OTHER PUBLICATIONS

Madec, Phillipe "COFDM With Tone Interference", Proceedings of 13th International Conference on Digital Signal Processing, Jul. 1977 pp. 1051-1054.*

French Search Report from French Patent Application No. 04/50312, filed Feb. 19, 2004.

* cited by examiner

DEVICE AND METHOD FOR SUPPRESSING PULSE INTERFERENCES IN A SIGNAL

BACKGROUND OF THE INVENTION

1. Field of the Invention

The present invention generally relates to a device and a method for suppressing pulse interferences contained in a signal. As an example, the present invention relates to a device and a method for suppressing pulse interferences for a demodulator of COFDM type ("Coded Orthogonal Frequency Division Multiplex").

2. Discussion of the Related Art

In COFDM modulation, data packets to be transmitted are put in the form of N complex coefficients associated with N respective frequencies (or carriers). Number N of the frequencies is equal, for example, to 1,705 for the so-called "2K" mode and to 6,817 for the so-called "8K" mode, in digital television radio transmission. The set of these N coefficients is processed by inverse fast Fourier transform (IFFT), which generates a "symbol" formed of a sum of modulated carriers, each carrier having an amplitude and a phase determined by the associated complex coefficient. The symbol thus generated is transmitted.

Conventionally, in radio transmission, the width of the information channel is 6, 7, or 8 MHz and each carrier is separated from the next one by a frequency difference $\Delta f=1/Tu$. Tu is the transmit time of a symbol and is called the operating lifetime. The operating lifetime is on the order of 224 µs in 2K mode and 896 µs in 8K mode, for a 8-MHz passband.

Upon reception, a receiver submits the symbol to the inverse processing, that is, mainly, a fast Fourier transform (FFT) to restore the initial complex coefficients. Certain carriers of the modulated signal, called pilot carriers, are used on demodulation to determine an estimate of the frequency response of the used information channel and to restore the fast Fourier transform of the modulated signal.

The signal received by the COFDM demodulator corresponds to the transmitted modulated signal modified by disturbances of various origins. It is thus necessary to correct the received signal to recover the transmitted signals. Among the disturbances affecting a received signal, the transmission noise and the pulse interferences can be distinguished. The transmission noise generally corresponds to a low-power disturbance which is permanently present and which is characteristic of the information channel taken by the signal between the receiver and the emitter. On the contrary, pulse interferences correspond to very short disturbances which however have a high power. Such disturbances are neither reproducible nor foreseeable, they are not present all the time, and may occur in isolated or grouped fashion at any time with an unforeseeable amplitude, duration, and starting time. Pulse interferences are, for example, due to electric equipments located close to the demodulator components.

The transmission noise and the pulse interferences can thus not be corrected with identical correction methods. The correction of the transmission noise generally uses the time stability properties of such a transmission. The correction of the pulse interferences generally implements a method consisting of individually detecting each pulse interference and of correcting the received modulated signal when a pulse interference is detected. An example of a conventional pulse interference detection and correction method is the zero substitution threshold detection method. Such a method is, for example, implemented on the demodulator referred to as STV0360, sold by STMicroelectronics. The case in point is to detect the presence of pulse interferences by comparing with a determined comparison threshold the amplitude of a digital modulated signal obtained by analog-to-digital conversion of the analog modulated signal received by the demodulator, generally after a frequency switching towards an intermediary frequency range. All the numerical values of the digital modulated signal greater than the determined threshold are replaced with a predetermined value, for example, the average value of the signal.

The main difficulty in threshold detection is the selection of the comparison threshold. Indeed, if the threshold is too high, only very high power pulse interferences are detected and pulse interferences with a lower power level cannot be detected. Conversely, if the detection threshold is too low, a portion of the digital modulated signal undisturbed by pulse interferences may be suppressed.

SUMMARY OF THE INVENTION

The present invention provides a device and a method for suppressing pulse interferences disturbing a signal, especially a signal received by a COFDM demodulator, enabling suppression of high-power pulse interferences, but also of medium-power pulse interferences, while limiting the risk of incorrect detection of pulse interferences.

To achieve this and other objects, the present invention provides a device for suppressing pulse interferences contained in a signal, comprising a circuit for detecting pulse interferences contained in the signal, and a circuit for correcting the signal disturbed by the detected pulse interferences, in which the detection circuit comprises a circuit for determining a first coefficient representative of a statistical feature of the variation of the signal over a first time period; a circuit for determining a second coefficient representative of a statistical feature of the variation of the signal over a second time period longer than the first time period; and a comparison circuit comparing the first and second coefficients and providing a signal indicative of the presence of a pulse interference over the first time period when the first coefficient clearly differs from the second coefficient.

According to an embodiment of the present invention, the circuit for determining the first coefficient determines the first coefficient based on absolute values of the successive digital values obtained by sampling of the signal during the first time period and the circuit for determining the second coefficient determines the second coefficient based on the absolute values of the successive digital values obtained by sampling of the signal during the second time period.

According to an embodiment of the present invention, the circuit for determining the first coefficient provides the sum of the absolute values of the successive digital values obtained by sampling of the signal during the first time period, each absolute value of a digital value greater than a determined threshold being replaced with a weighting constant greater than or equal to the threshold.

According to an embodiment of the present invention, the circuit for determining the first coefficient comprises a first input receiving first successive digital values provided by the signal sampling; a second input receiving second successive digital values provided by the signal sampling shifted in time with respect to the first successive digital values of the first time period; a first processing circuit connected to the first input and capable of providing third successive digital values corresponding to the absolute values of the first successive digital values, each absolute value of a first digital value greater than the threshold being replaced with the weighting constant; a second processing circuit connected to the second input and capable of providing fourth successive digital values corresponding to the absolute values of the second successive digital values, each absolute value of a second digital value greater than the threshold being replaced with the weighting constant; a subtractor connected to the first and second weighting circuits and successively providing fifth successive digital values corresponding to the subtraction between the fourth successive digital values and the third successive digital values; and an adder having a first input receiving the fifth successive digital values and having a second input connected to the output of the adder and providing sixth successive digital values corresponding to the first coefficient.

According to an object of the present invention, the weighting constant is greater than or equal to three times the threshold.

According to an object of the present invention, the circuit for determining the second coefficient comprises an input receiving first successive digital values provided by the sampling of the signal; a processing circuit connected to the input and capable of providing second successive digital values corresponding to the absolute values of the first successive digital values, each absolute value of a first digital value greater than the threshold being replaced with a weighting constant smaller than or equal to the threshold; an adder having a first input receiving the second successive digital values and having a second input connected to the output of the adder and providing third successive digital values; and a circuit receiving the third successive digital values and providing fourth successive digital values, corresponding to the second coefficient, equal to the third successive digital values multiplied by the ratio between the first time period and the second time period.

According to an object of the present invention, the second input of the adder receives the zero value during an operating cycle of the adder after a determined number of successive operating cycles equivalent to the second time period.

According to an object of the present invention, the third successive digital values are multiplied by a correction coefficient greater than or equal to 2.

The present invention also provides a method for suppressing pulse interferences contained in a signal, comprising a step of detection of the pulse interferences contained in the signal, and a step of correction of the detected pulse interferences, in which the detection step comprises a step of determination of a first coefficient representative of a statistical feature of the variation of the signal over a first time period and of a second coefficient representative of a statistical feature of the signal variation over a second time period greater than the first time period; and a step of detection of the presence of a pulse interference on the signal by comparison of the first and second coefficients.

According to an embodiment of the present invention, the first coefficient corresponds to the sum of the absolute values, possibly corrected, of the successive digital values obtained by sampling of the signal during the first time period and in which the second coefficient corresponds to the sum of the absolute values, possibly corrected, of the successive digital values obtained by sampling of the signal during the second time period.

The foregoing object, features, and advantages of the present invention, as well as others, will be discussed in detail in the following non-limiting description of specific embodiments in connection with the accompanying drawings.

DETAILED DESCRIPTION

The present invention will now be described for a COFDM demodulator. It should be clear that the present invention applies to any system for processing a signal disturbed by pulse interferences which is desired to be corrected.

Figure 1:
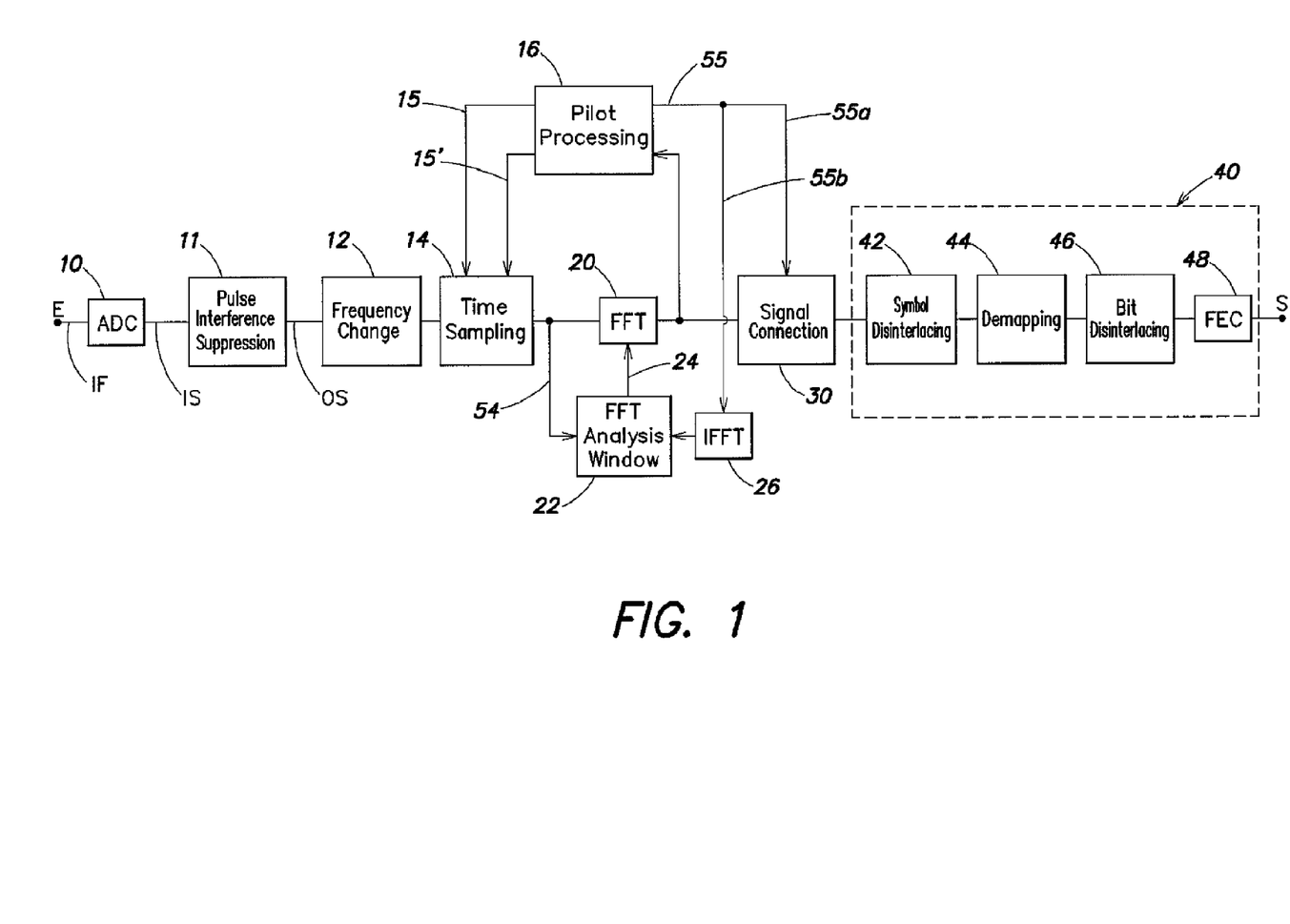
FIG. 1 schematically shows an example of the forming of a COFDM demodulator according to the present invention.

FIG. 1 shows, in more detail, an example of a COFDM demodulator according to the present invention. An input E of the demodulator receives a signal IF of intermediary frequency enabling a sampling, for example, 36 MHz. Signal IF corresponds to the signal received after various frequency switchings or transpositions.

Input E is coupled to an analog-to-digital converter 10 (ADC) which digitizes input signal IF. Analog-to-digital converter 10 provides a signal IS to a pulse interference suppression unit 11. Unit 11 provides a signal OS corresponding to signed signal IS in which pulse interferences are suppressed. Unit 11 drives a frequency change unit 12. Unit 12 provides a signal substantially in baseband, the signal spectrum at the output of unit 12 being centered on a frequency substantially equal to zero. Unit 12 is coupled to a unit 14, enabling, on the one hand, fine setting of the central frequency of the signal spectrum and, on the other hand, providing time samples at times appropriate to the subsequent processing. At the output of unit 14, the signal spectrum is centered on a frequency equal to 0 and the number and time position of the samples are adapted to the transformation by Fourier transform which is performed in the next unit. Unit 14 is controlled by connections 15 and 15' connecting unit 14 to a pilot processing unit 16.

The output of unit 14 drives a fast Fourier transform unit 20 (FFT) which provides the frequencies corresponding to a symbol. Unit 20 is driven by a unit 22 which provides, via a connection 24, a signal for setting the analysis window of the Fourier transform.

The output of unit 20 is coupled to unit 16 which performs the pilot extraction and processing. Unit 16 provides, on connections 15 and 15', the signals intended to correct the central frequency of the spectrum and the sampling frequency of the signal.

The output of unit 20 drives a unit 30 in which the signal is corrected by means of an estimate of the frequency response of the channel. The estimate of the channel frequency response is performed in unit 16 by means of the pilots. This estimate is provided by unit 16 on a connection 55, having a branch 55a coupled to unit 30. At the output of unit 30, the signal especially comprises the carriers conveying the data.

The estimate of the channel frequency response, provided by unit 16, supplies, via connection 55 and a branch 55b of connection 55, an inverse fast Fourier transform unit 26 (IFFT), to determine the channel pulse response. Unit 26 provides the channel pulse response to unit 22, to dynamically adjust the positioning of the FFT analysis window.

Figure 4:
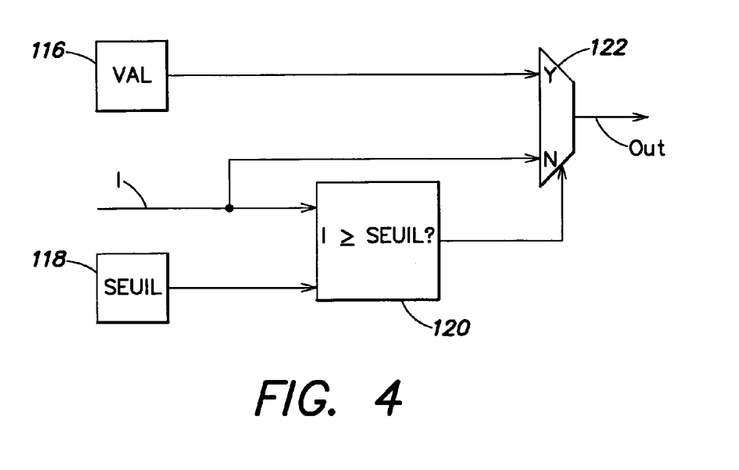
FIG. 4 shows a more detailed diagram of a component of FIG. 3.

The processing of the carriers conveying the data is ensured in a data processing and provision circuit 40. Circuit 40 has a conventional structure and may comprise, as shown in FIG. 4, a symbol disinterlacing unit 42, a so-called "demapping" unit 44, a bit disinterlacing unit 46, and an error correction unit 48 (FEC). The output of unit 48 forms output S of circuit 40 and of the demodulator and provides data corresponding to the transmitted data. Unit 22 receives the output signal of unit 14 over a connection 54, to roughly adjust the analysis window.

Figure 2:
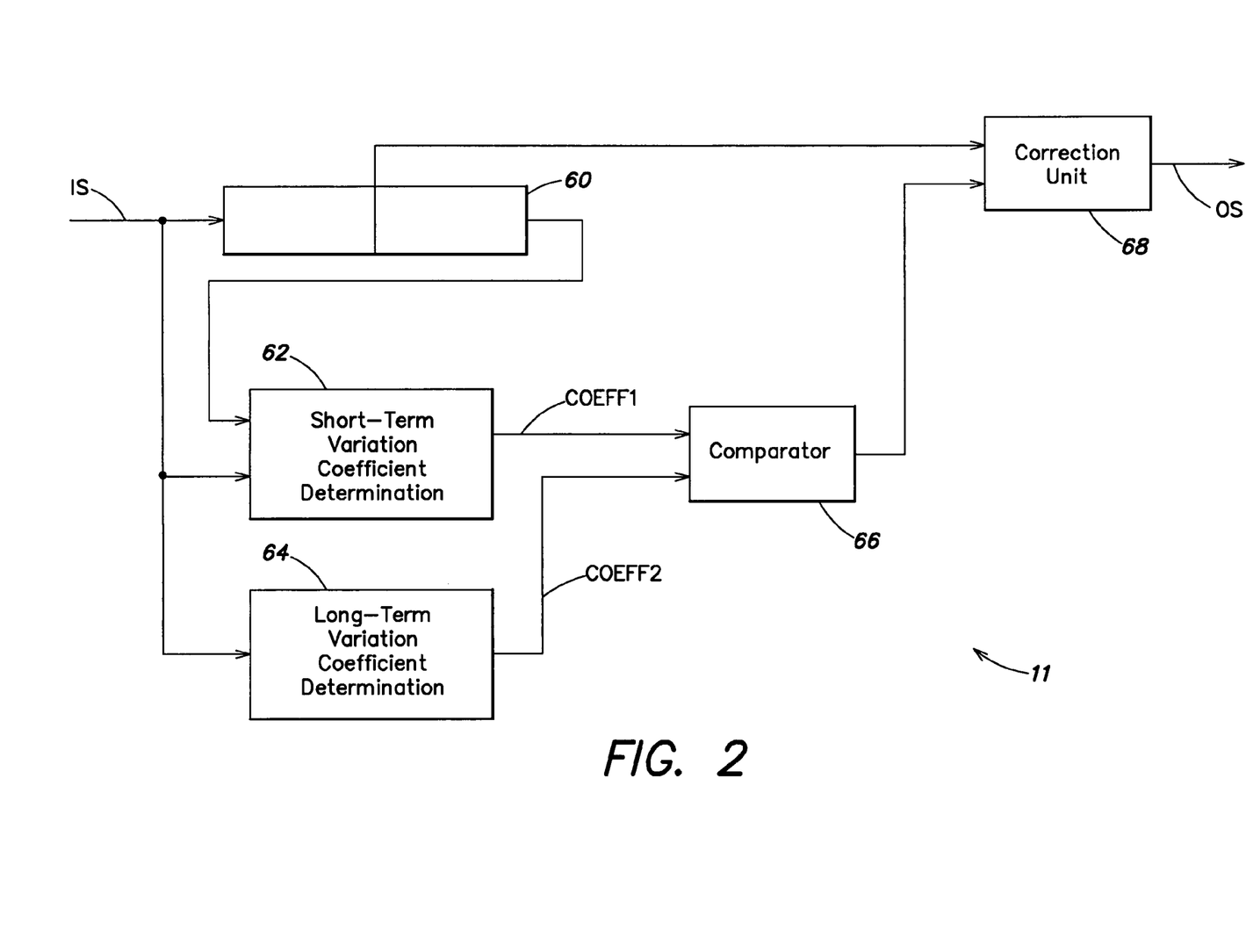
FIG. 2 schematically shows an example of the pulse interference suppression unit of the demodulator of FIG. 1.

FIG. 2 schematically shows an example of the forming of pulse interference suppression unit 11 according to the present invention. Unit 11 receives signal IS at the output of analog-to-digital converter 10, and provides output signal OS which drives baseband signal transfer unit 12.

Unit 11 comprises a memory 60 capable of simultaneously storing the last N successive digital values of input signal IS received by unit 11, N being as an example an even natural integer on the order of from 32 to 64. After, the most recent value of signal IS received by unit 11 will be called the time-t0 value of signal IS and the N successive digital values of signal IS stored in memory 60 will respectively be called the time-t1 to –tN values of signal IS, the time-tN digital value of signal IS being the oldest.

Unit 11 comprises a unit 62 for determining a coefficient COEFF1 representative of the variation of input signal IS for the last N received digital values of signal IS, which will be called hereafter the short-term variation coefficient which, for example, receives the time-t0 digital value of signal IS and the time-tN digital value of signal IS stored in memory 60 or which receives all the values stored in memory 60. Unit 11 comprises a unit 64 for determining a coefficient COEFF2 representative of the variation of the signal received by the demodulator for a number of recently-received digital values much greater than N, which will be called hereafter the long-term variation coefficient, which receives the time-t0 digital value of signal IS.

A comparator 66 determines the presence or the absence of a pulse interference on the last N received digital values of signal IS by comparing short-term and long-term variation coefficients COEFF1 and COEFF2 with a determined comparison criterion. A correction unit 68 receives the digital value of time N/2 signal IS stored in memory 60 and the output of comparator unit 66 and corrects the digital value of time-tN/2 signal IS to provide digital output signal OS if comparator unit 66 has detected the presence of a pulse interference.

According to the present example of implementation, the correction performed by correction unit 68 comprises replacing the digital value of time tN/2 input signal IS, provided by memory 60, with an average value, or by any constant value, on detection of a pulse interference.

An example of a variation coefficient adapted to the detection of pulse interferences is the standard deviation. However, calculating the standard deviation requires multiplication operations which, when performed by an integrated circuit, require a circuit taking up a significant silicon surface area. It can thus be advantageous to use a coefficient corresponding to an approximation of the standard deviation and the calculation of which essentially implements additions that can be performed by a circuit taking up a reduced silicon surface area. In the example of implementation described hereafter, the used variation coefficient corresponds to the sum of the absolute values of digital values, possibly corrected, of digital signal IS. Such a coefficient provides an information similar to that of the standard deviation and will thus be called the pseudo standard deviation coefficient. Long-term pseudo standard deviation coefficient COEFF2, determined based on a relatively large number of successive digital values of input signal IS, tends towards the pseudo standard deviation coefficient which would be obtained with an input signal IS undisturbed by pulse interferences. Short-term pseudo standard deviation coefficient COEFF1, determined for a smaller number N of successive digital values of input digital signal IS, varies significantly when a pulse interference is present on the N successive digital values used to calculate the short-term pseudo standard deviation coefficient. By comparing short-term pseudo standard deviation coefficient COEFF1 and long-term pseudo standard deviation coefficient COEFF2, a conclusion can be made as to the absence or the presence of pulse interferences on the N digital values used to determine the short-term pseudo standard deviation coefficient, and thus modify or not the digital value located in the middle of the N successive digital values used to determine the short-term pseudo standard deviation coefficient.

Figure 3:
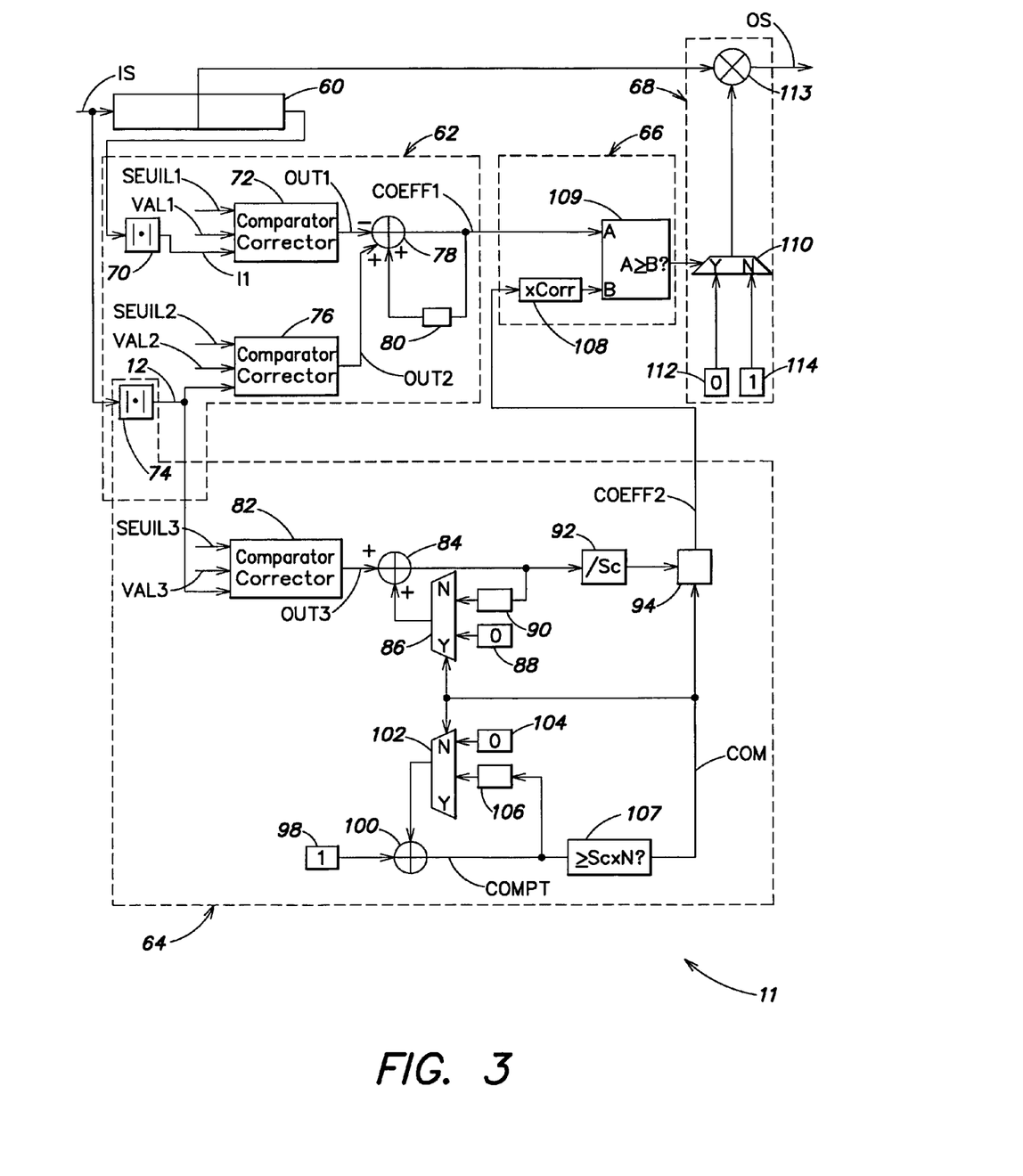
FIG. 3 shows a more detailed diagram of the pulse interference suppression unit of FIG. 2.

FIG. 3 shows a more detailed example of the forming of unit 11 of FIG. 2. Unit 62 for determining the short-term pseudo standard deviation coefficient comprises an absolute value unit 70 which receives the successive digital values of time-N signal IS stored in memory 60 and which provides a signal I1 corresponding to the absolute values of the successive digital values of time-tN signal IS. Absolute value unit 70 drives a comparator-corrector unit 72. Comparator-corrector unit 72 compares signal I1 to a threshold SEUIL1. If signal I1 is smaller than threshold SEUIL1, comparator-corrector 72 provides a signal OUT1 equal to signal I1, unmodified. If signal I1 is greater than threshold SEUIL1, comparator-corrector 72 provides a signal OUT1 equal to a weighting constant VAL1. Further, unit 62 comprises an absolute value unit 74 which provides a signal I2 corresponding to the absolute values of the successive digital values of time t0 signal IS and which drives a comparator-corrector unit 76, similar to unit 72. Comparator-corrector unit 74 compares signal I2 with a threshold SEUIL2. If signal I2 is smaller than threshold SEUIL2, comparator-corrector 74 provides a signal OUT2 equal to signal I2, unmodified. If signal I2 is greater than threshold SEUIL2, comparator-corrector 74 provides a signal OUT2 equal to a weighting constant VAL2. Thresholds SEUIL1 and SEUIL2 are identical and weighting constants VAL1 and VAL2 are identical and equal to a multiple of threshold SEUIL1, for example, four time threshold SEUIL1. Unit 62 comprises an adder-subtractor 78 receiving signals OUT1 and OUT2 and the output of a memory 80 in which is stored the last value provided by adder-subtractor 78. Adder-subtractor 78 adds the content of memory 80 and of signal OUT2, to which it subtracts signal OUT1. Adder-subtractor 78 provides, to an input A of comparator unit 66, a signal COEFF1, corresponding to the short-term pseudo standard deviation coefficient, which is equal to the sum of N successive value of signal OUT3. The use of weighting constants VAL1, VAL2 enables increasing the weight of the values of signal I2 of high amplitude in the determination of coefficient COEFF1.

Unit 64 for determining the long-term pseudo standard deviation coefficient comprises absolute value unit 64, in common with unit 62, which drives a comparator-corrector unit 82 similar to units 72, 76. Comparator-corrector unit 82 compares signal I2 with a threshold SEUIL3. If signal I2 is smaller than threshold SEUIL3, comparator-corrector 82 provides a signal OUT3 equal to signal I2, unmodified. If signal I2 is greater than threshold SEUIL3, comparator-corrector 82 provides a signal OUT3 equal to a weighting constant VAL3. In the present example, weighting constant VAL3 is zero, which enables discarding from the start the values of signal I2 having a very high amplitude in the determination of the long-term pseudo standard deviation coefficient.

Unit 64 comprises an adder 84 receiving signal OUT3 and the output of a multiplexer 86. Multiplexer 86 receives, at a first input, the content of a memory 88 in which is stored the zero value and at a second input the content of a memory 90 in which is stored the signal provided by adder 84. Adder 84 drives a unit 92 performing a division of the signal provided by adder 84 by a scale factor Sc. The output of unit 92 drives a latch 94 controlled by a control signal COM. Latch 94 provides a signal COEFF2, corresponding to the long-term pseudo standard deviation coefficient.

Multiplexer 86 is controlled by control signal COM. As will be described in more detail hereafter, control signal COM is practically continually equal to zero. Multiplexer 86 then provides the content of memory 90. Adder 84 thus adds to signal OUT3 the content of memory 90, the sum being stored again in memory 90. The sum of the digital values forming signal OUT3, divided by scale coefficient Sc, is thus provided at the input of latch 94, which remains latched. When the sum is calculated for N×Sc successive values of signal OUT3, control signal COM switches to 1 for an operation clock cycle of unit 11. Latch 94 then becomes conductive and thus provides signal COEFF2 corresponding to the sum, divided by scale factor Sc, of the last N×Sc successive values of signal OUT3. Control signal COM being at 1, multiplexer 86 provides the zero value, and adder 84 reproduces at its output signal OUT3. Control signal COM switches back to 0 at the next clock cycle, causing the calculation of the sum of the next N×Sc values of signal OUT3. Signal COEFF2, provided by unit 64, is thus "refreshed" every N×Sc clock cycles.

To obtain control signal COM, unit 64 comprises a memory 98 providing, at each clock cycle, value 1 to an adder 100 further receiving the output of a multiplexer 102 and providing an incrementation signal COMPT. Multiplexer 102 receives at an input the content of a memory 104 in which is stored the zero value and at another input the content of a memory 106 in which is stored incrementation signal COMPT. Multiplexer 102 is controlled by control signal COM. As long as control signal COM is equal to 0, multiplexer 102 provides adder 100 with the output of memory 106. In this case, at each clock cycle, incrementation signal COMPT increases by one unit. Adder 100 drives a comparator 107 which compares incrementation signal COMPT with a threshold equal to the product of integer N and of scale factor Sc. As an example, scale factor Sc is equal to several hundreds. Comparator 107 provides control signal COM which is equal to value 1 when incrementation signal COMPT is greater than N×Sc, and equal to 0 when incrementation signal COMPT is smaller than N×Sc. As soon as control signal COM switches to 1, multiplexer 102 provides the zero value and incrementation signal COMPT switches back to 1. Control signal COM then switches back to zero. Control signal COM thus only keeps value 1 for a single clock cycle.

Signal COEFF2 corresponds to the sum, divided by scale factor Sc, of N×Sc successive values of signal OUT3, that is, for a number of values larger by factor Sc than the number of values used to provide signal COEFF1.

Comparator unit 66 comprises a unit 108 receiving signal COEFF2, provided by latch 94, and which multiplies signal COEFF2 by a corrective coefficient Corr. As an example corrective coefficient Corr is equal to 3. Comparator unit 66 comprises a comparator 109 receiving at an input A signal COEFF1 and at an input B the output of unit 108. Comparator 109 provides a signal equal to 1 if the signal received at input A is greater than the signal received at input B and provides a signal equal to 0 in the opposite case.

Correction unit 68 comprises a multiplexer 110 controlled by the output of comparator 109 and receiving at a first input the content of a memory 112 in which is stored a weighting constant, generally a value smaller than one, for example, the zero value, and at a second input the content of a memory 114 in which is stored value 1. Multiplexer 110 drives a multiplier 113 which provides output signal OS. When signal COEFF1 is greater than signal COEFF2 multiplied by corrective factor Corr, multiplexer 110 provides the weighting constant stored in memory 112, and signal OS is equal to the value of time tN/2 input signal IS stored in memory 60 multiplied by the weighting constant stored in memory 112. When signal COEFF1 is smaller than signal COEFF2 multiplied by corrective factor Corr, multiplexer 110 provides value 1 and signal OS is equal to the value of time tN/2 input signal IS stored in memory 60. Correc-tive coefficient Corr enables adjusting the "sensitivity" of unit 11 to avoid suppression of undisturbed portions of signal IS.

FIG. 4 describes in more detail an example of the forming of comparator-corrector units 72, 76, and 82. Each of these units receives a digital signal I (I1 for unit 72 and I2 for units 76 and 82). Each unit comprises a first memory 116 in which is stored a weighting constant VAL (respectively VAL1, VAL2, VAL3 for units 72, 76, and 82) and a second memory 118 in which is stored a comparison threshold value SEUIL (respectively, SEUIL1, SEUIL2, and SEUIL3 for units 72, 76, and 82). The unit comprises a comparator 120 capable of comparing signal I with comparison threshold value SEUIL. Comparator 120 controls a multiplexer 122 receiving at a first input weighting constant VAL and a second input signal I. Multiplexer 122 provides an output signal OUT equal to weighting constant VAL when signal I is greater than threshold SEUIL, and provides unmodified signal I in the opposite case.

Figure 5:
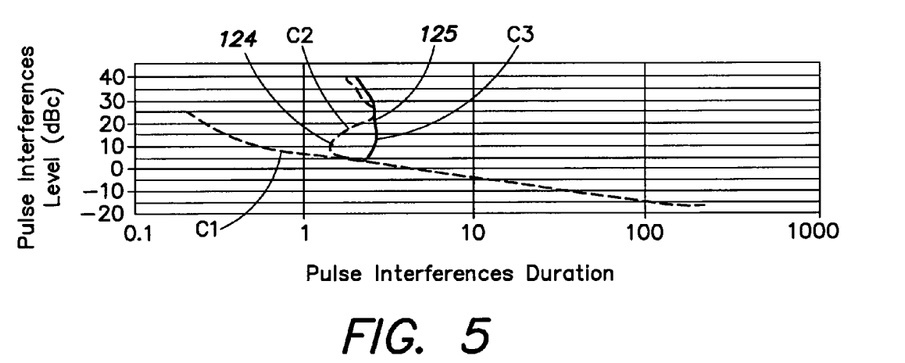
FIGS. 5 and 6 show, each for a type of COFDM demodulator, curves indicating the pulse interferences which are detected by the demodulator when no pulse interference suppression method is implemented, when a pulse interference correction method of threshold detection type is implemented, and when a pulse interference correction method according to the present invention is implemented.
Figure 6:
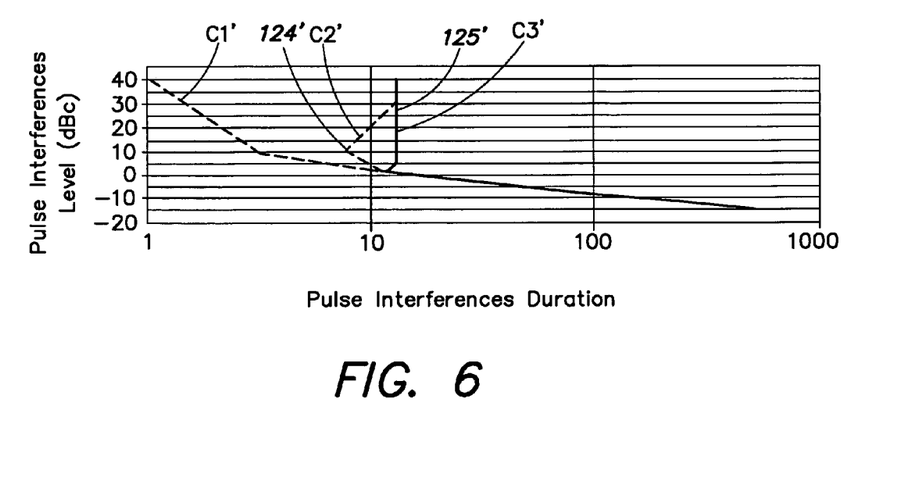

FIGS. 5 and 6 show, for a COFDM demodulator of type 2K, of 64 QAM modulation, of 2/3 punching ratio (PR=2/3), and an 8K-type COFDM demodulator, of 64-QAM modulation and PR=2/3, the correction capacity of a demodulator when a received symbol is disturbed by a pulse interference. In FIG. 5 (respectively in FIG. 6), the abscissa axis corresponds to the duration of the pulse interferences, expressed in µs, and the ordinate axis corresponds to the ratio, expressed in decibel, between the power level of the pulse interferences and the power of the COFDM signal.

Three curves C1, C2, C3 (respectively C1', C2', C3') are shown and each delimit a region under the curve corresponding to the pulse interferences that can be corrected by the demodulator, and a region above the curve corresponding to the pulse interferences that cannot be corrected by the demodulator and thus cause a degradation of the finally-demodulated signal. Curve C1 (respectively C1') shows the limit of the tolerance to pulse interferences for a demodulator comprising no pulse interference suppression unit. Curve C2 (respectively C2') shows the limit of the tolerance to pulse interferences for a demodulator equipped with a conventional threshold detection pulse interference suppression unit as described hereabove. Curve C3 (respectively C3') shows the limit of the tolerance to pulse interferences for a demodulator equipped with a pulse interference suppression unit 11 according to the present invention. Curves of similar shape are obtained for any type of COFDM demodulator comprising a pulse interference suppression unit according to the present invention.

Curve C2 (respectively C2') comprises a swelling 124 (respectively 124') for pulse interferences on the order of 2 µs (respectively, 10 µs). This illustrates that, as described hereabove, the threshold detection pulse interference suppression unit is efficient to suppress high-power pulse interferences, but does not suppress low-power pulse interferences.

Curve C3 (respectively C3') comprises a vertical right-hand portion 125 (respectively, 125') which corresponds to the theoretical limit of the tolerance to disturbances that a demodulator can accept. Indeed, it is known that a symbol disturbed by a disturbance with a power greater than approximately 1% of the power of a symbol can no longer be restored properly. For a 2K modulation, the duration of a desired symbol being 224 µs, only a pulse interference of duration smaller than approximately 2.3 µs is thus considered. For an 8K modulation, the duration of a desired symbol being 896 µs, only a pulse interference of duration smaller than approximately 10 µs is thus considered. Curve C3 (respectively C3') follows the theoretical limit more than curve C2 (respectively C2'). The demodulator comprising the pulse interference suppression unit according to the present invention thus enables correcting a transmitted modulated signal disturbed by pulse interferences over a larger range of interference durations or interference power levels than a demodulator comprising a threshold detection pulse interference suppression unit.

Of course, the present invention is likely to have various, alterations, improvements, and modifications which will readily occur to those skilled in the art. Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A device for suppressing pulse interferences contained in a signal, comprising:
    a circuit for detecting pulse interferences contained in the signal, wherein the detection circuit comprises:
        a circuit for determining a first coefficient representative of a statistical feature of the variation of the signal over a first time period, wherein the circuit for determining the first coefficient determines the first coefficient based on absolute values of the digital values obtained by sampling of the signal during the first time period, and provides the sum of the absolute values of the digital values obtained by sampling of the signal during the first time period, each absolute value of a digital value greater than a threshold being replaced with a weighting constant greater than or equal to the threshold;
        a circuit for determining a second coefficient representative of a statistical feature of the variation of the signal over a second time period longer than the first time period, wherein the circuit for determining the second coefficient determines the second coefficient based on the absolute values of the digital values obtained by sampling of the signal during the second time period; and
        a comparison circuit comparing the first coefficient to the second coefficient and providing a signal indicative of the presence of a pulse interference over the first time period when the first coefficient clearly differs from the second coefficient; and
    a correction circuit for correcting the signal disturbed by the detected pulse interference.

2. The device of claim 1, wherein the circuit for determining the first coefficient comprises:
    a first input receiving first digital values provided by the sampling of the signal;
    a second input receiving second digital values provided by the signal sampling shifted in time with respect to the first digital values of the first time period;
    a first processing circuit connected to the first input and capable of providing third digital values corresponding to the absolute values of the first digital values, each absolute value of a first digital value greater than the threshold being replaced with the weighting constant;
    a second processing circuit connected to the second input and capable of providing fourth digital values corresponding to the absolute values of the second digital values, each absolute value of a second digital value greater than the threshold being replaced with the weighting constant;
    a subtractor connected to the first and second weighting circuits and successively providing fifth digital values corresponding to the subtraction between the fourth digital values and the third digital values; and
    an adder having a first input receiving the fifth digital values and having a second input connected to the output of the adder and providing sixth digital values corresponding to the first coefficient.

3. The device of claim 2, wherein the weighting constant is greater than or equal to three times the threshold.

4. The device of claim 1, wherein the circuit for determining the second coefficient comprises:
    an input receiving first digital values provided by the sampling of the signal;
    a processing circuit connected to the input and capable of providing second digital values corresponding to the absolute values of the first digital values, each absolute value of a first digital value greater than a threshold being replaced with a weighting constant smaller than or equal to the threshold;
    an adder having a first input receiving the second digital values and having a second input connected to the output of the adder and providing third digital values; and
    a circuit receiving the third digital values and providing fourth digital values, corresponding to the second coefficient, equal to the third digital values multiplied by the ratio between the first time period and the second time period.

5. The device of claim 4, wherein the second input of the adder receives the zero value during an operating cycle of the adder after a number of operating cycles equivalent to the second time period.

6. The device of claim 4, wherein the third digital values are multiplied by a correction coefficient greater than or equal to 2.

7. A pulse interference suppression apparatus comprising:
    a storage device storing, at least partially, an input signal;
    a first circuit determining a first coefficient representative of a feature of the input signal over a first time period;
    a second circuit determining a second coefficient representative of a feature of the input signal over a second time period longer than the first time period, wherein the second coefficient is modified using a correction coefficient;

a comparison circuit comparing the first coefficient to the second coefficient and providing a compare signal indicative of the presence of a pulse interference over the first time period; and a correction circuit correcting the input signal in response to the compare signal indicative of the presence of pulse interference.

8. The apparatus of claim 7, further comprising a control circuit controlling when the second coefficient is provided to the comparison circuit.

9. The apparatus of claim 7, wherein the correction circuit comprises a multiplier to multiply contents of the storage device by contents of a first memory or a second memory.

10. The apparatus of claim 9, wherein the first memory stores a weighting constant.

11. The apparatus of claim 10, wherein the weighting constant is zero or less than 1.

12. The apparatus of claim 7, wherein the correction coefficient is proportional to a sensitivity of the pulse interference suppression apparatus.

13. The apparatus of claim 8, wherein the control circuit provides the second coefficient when an incrementation signal is greater than a control threshold.

* * * * *